US006450012B1

(12) United States Patent
Mayer et al.

(10) Patent No.: US 6,450,012 B1
(45) Date of Patent: Sep. 17, 2002

(54) MULTI-PORT GAS LEAKAGE MEASUREMENT FIXTURE

(75) Inventors: Daniel W. Mayer, Wyoming; Mark D. Evans, Paul, both of MN (US)

(73) Assignee: Mocon, Inc., Minneapolis, MN (US)

( * ) Notice: Subject to any disclaimer, the term of this patent is extended or adjusted under 35 U.S.C. 154(b) by 0 days.

(21) Appl. No.: 09/845,914

(22) Filed: Apr. 30, 2001

(51) Int. Cl.$^7$ ................................................. G01M 3/34
(52) U.S. Cl. ........................................ 73/49.3; 73/40.7
(58) Field of Search ................................. 73/49.3, 45.4, 73/40, 38

(56) References Cited

U.S. PATENT DOCUMENTS

| | | | | | |
|---|---|---|---|---|---|
| 3,672,207 | A | * | 6/1972 | Cramp et al. ................. | 73/40.7 |
| 4,561,289 | A | * | 12/1985 | Jones ............................. | 73/38 |
| 4,643,019 | A | * | 2/1987 | Jones ............................. | 73/38 |
| 4,747,299 | A | * | 5/1988 | Fox et al. ..................... | 73/49.3 |
| 4,774,830 | A | * | 10/1988 | Hulsman ..................... | 73/49.3 |
| 4,899,574 | A | * | 2/1990 | Potteiger ........................ | 73/52 |
| 4,922,746 | A | * | 5/1990 | Hulsman et al. ............. | 73/49.3 |
| 5,150,605 | A | * | 9/1992 | Simpson ..................... | 73/49.3 |
| 5,156,329 | A | * | 10/1992 | Farrell ......................... | 229/125 |
| 5,226,316 | A | * | 7/1993 | Mally et al. ................. | 73/49.3 |
| 5,285,678 | A | * | 2/1994 | McDaniel et al. ........... | 73/49.3 |
| 5,365,774 | A | * | 11/1994 | Horlacher ................... | 73/49.3 |
| 5,497,654 | A | * | 3/1996 | Lehmann ..................... | 73/49.3 |
| 5,939,619 | A | | 8/1999 | Achter et al. | |
| 6,050,133 | A | | 4/2000 | Achter et al. | |

* cited by examiner

Primary Examiner—Hezron Williams
Assistant Examiner—Charles D. Garber

(57) ABSTRACT

A testing device for measuring leakage from packages, the device having an internal chamber for receiving the package and a cover for sealing the package into the chamber. A gas passage from the chamber to a gas detector carries gas to be measured, and an air passage into the chamber provides a purging passage, and a gas inlet passage though the cover admits gas into the upper part of the chamber.

11 Claims, 5 Drawing Sheets

-22-

MULTI-PORT GAS LEAKAGE MEASUREMENT FIXTURE

BACKGROUND OF THE INVENTION

The present invention relates to an apparatus for measuring the amount of gas that leaks through a package, including the package seals. A thin film membrane typically is adhesively attached over an open top of such packaging, the membrane having a characteristic of being relatively porous to the passage of certain gases but a barrier to the passage of bacteria. The present invention also relates to a method for measuring the amount of gas that leaks through sealed packages of the above-described types. More specifically, the invention relates to gas leakage through packages that have been sealed by a cover of porous material fabricated as a mat of polyethylene fibers. This material acts as a permeable membrane to gases, but an impermeable membrane to bacteria. The membrane comprises a layer having pores which provide a tortuous path to the passage of bacteria; the material is commonly sold under the trademark designation "TYVEC." The packages which use this material are typically semi-rigid plastic cases which protect medical devices and appliances after manufacture and before actual use.

The invention relates to U.S. Pat. No. 5,939,619, issued Aug. 17, 1999, entitled "Method and Apparatus for Detecting Leaks in Packaging," and U.S. Pat. No. 6,050,133, issued Apr. 18, 2000, entitled "Method and Apparatus for Detecting Leaks in Packaging." Both of these patents are owned by the assignee of the present invention. The present invention also relates to co-pending application entitled "Method for Measuring Gas Leakage From Sealed Packages," Ser. No. 09/676,621, filed Oct. 2, 2000, and owned by the assignee of the present invention. The present invention permits a measurement of leakage that is wholly non-destructive to the package.

Gas sterilization is widely used for medical devices that must be sterile at the time of use, but cannot be subjected to sterilization by the application of high temperatures. Examples of such medical devices include cardiac pacemakers and catheter-based monitoring devices such as blood pressure probes. Typically, the medical device is sealed within a package that is permeable to gases but impermeable to bacteria. The package is then placed in a gas sterilization chamber, and a sterilizing gas such as ethylene oxide is introduced into the gas-permeable package to achieve sterilization. The sterilizing gas is then removed from the package, leaving the interior of the package sterile and non-toxic.

In a typical design, the medical device is placed within a thermoformed rigid plastic tray equipped with a flat sealing flange. A sheet of gas-permeable membrane, such as DuPont TYVEK® 1073-B (medical grade) brand membrane, which is available from E.I. duPont de Nemours & Co., is then sealed to the sealing flange, typically by using an adhesive. The integrity of the seal is critically important to maintaining sterility. Leaks can result from incorrect setting of parameters in the automated sealing process, or from physical defects such as burrs on the face of the sealing equipment or pin holes in the plastic tray.

According to the known practice described in the prior art patents listed herein, a temporary barrier is formed over the gas-permeable layer, wherein the temporary barrier has an aperture with the gas-permeable layer to temporarily seal the gas-permeable layer except where the aperture is located. A tracer gas is applied under low pressure through the aperture so that it can enter into the interior chamber of the package. The entire package is placed into a larger sealed second chamber, and the concentration of tracer gas in the second chamber is measured, outside the package, to thereby measure the amount of tracer gas which has leaked through the package, presumably via leaks in the sealing flange, although leakage can also occur through pinhole defects in the plastic tray itself.

The methods described in the foregoing patents provide very accurate measurements and evaluations for sealed packages, under controlled conditions. However, in many applications, it is not necessary to achieve a high degree of accuracy in the leakage measurement, but is desirable to provide a quick evaluation of leakage as a production line test, to determine whether packages are leaking excessively. Excessive leakage is defined in terms of leakage beyond a predetermined range of acceptability, as a pass/fail parameter, and the precise degree of leakage does not need to by quantified. Methods for making this type of determination should produce results more quickly and at a lesser cost.

The present invention provides a pass/fail test which can be quickly performed at considerably less cost in terms of test equipment and testing time, because it relies on measurement of internal package gas pressure, and specifically pressure drop, caused by leakage of gas from within the package. The method of the present invention can be performed in a short time, perhaps 30–60 seconds, using very much less expensive equipment than prior art methods.

SUMMARY OF THE INVENTION

The present invention comprises an apparatus for measuring the gas leakage through a package which has been prepared to hold a sterilized object in isolation from ambient air and potentially harmful gases. The invention also comprises a method for making leakage measurements using the aforementioned apparatus, comprising the steps of It is a principal object and advantage of the present invention to provide a method for measuring gas leakage from a package.

It is another object and advantage of the present invention to provide a leakage measurement apparatus which does not degrade or otherwise harm the package being measured or its contents.

Other and further objects and advantages of the invention will become apparent from the following specification and claims and with reference to the appended drawings.

DESCRIPTION OF THE PREFERRED EMBODIMENT

Figure 1A:
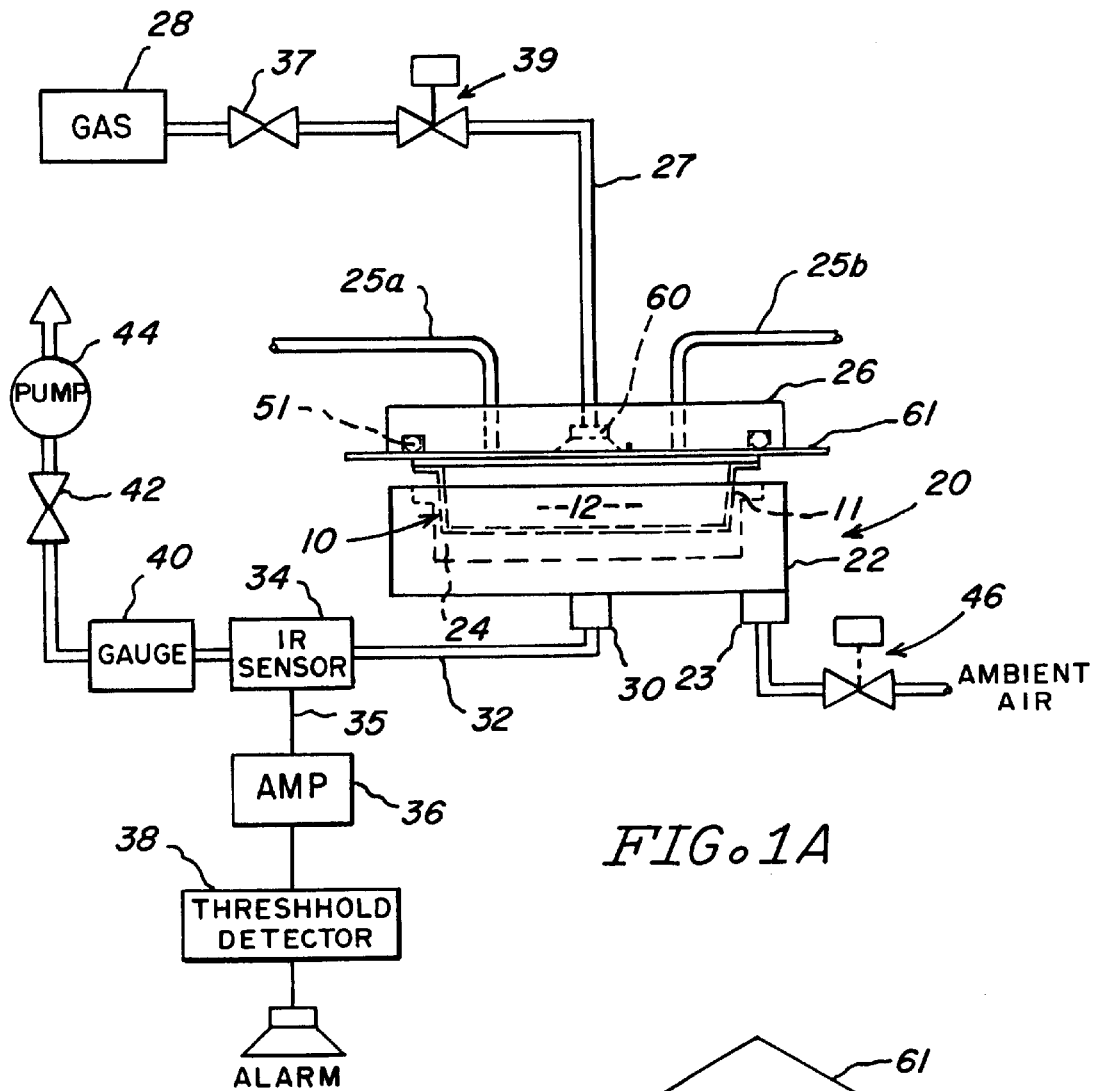
FIG. 1A shows a symbolic diagram of a system for testing for leakage, including the present invention.

Referring to the drawing figures, it should be understood that the test apparatus shown in each figure illustrates components which are not necessarily drawn to scale. In the figures, like reference characters refer to the same or functionally similar parts of the respective devices illustrated in each of the figures.

Figure 1B:
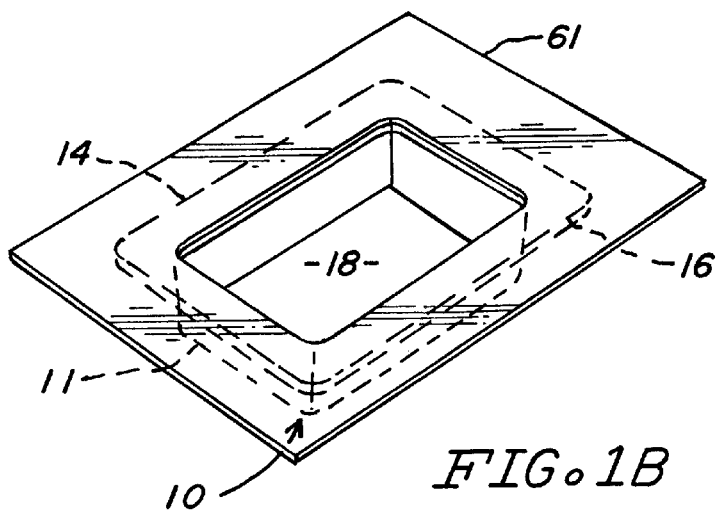
FIG. 1B shows the type of package which is preferably tested with the invention, after the package has been prepared for testing.

Referring first to FIG. 1B, a typical package of the type intended for testing with the present invention is shown, comprising a sealed package 10. The sealed package 10 includes a tray 11, a sealing flange 14 with an adhesive sealant 16 applied thereto and a gas-permeable sheet or membrane 18 affixed to the sealing flange 14 by the sealant 16, all enclosing an interior chamber 12. The sealant 16 forms a sealing bead around the perimeter of the flange 14 and the perimeter of the gas-permeable sheet or membrane 18. The gas-permeable membrane 18 is a porous membrane formed of a thermoplastic or paper that allows passage through the membrane of a gas but not larger particles, such as dust, bacteria, etc. In one embodiment of a sealed package that the present invention is usefully applied to, the gas-permeable membrane 18 is a mat of polyolefin fibers available from duPont under the trademark TYVEK. Typically, the gas-permeable membrane 18 has a thickness in the range of between about 0.127 and 0.254 millimeters. In preparing the package 10 for testing, an adhesive tape 61 is applied about the upper edges of the membrane 18, for purposes which will be hereinafter described.

Referring to FIG. 1A, the leak detection apparatus 20 has a housing 22 which encloses a chamber 24, of sufficient size for holding the package 10. The housing 22 is made from a non-gas-permeable material. A cover 26 can be clamped over the housing 22, to tightly seal the adhesive tape 61 against an upper edge of the housing 22, using an O-ring 51, after the package 10 is placed into the chamber 24. Cover 26 has an inlet gas conduit 27 connected to a gas source 28 via a solenoid valve 39 and a needle valve 37, as will be more described hereinafter. A pair of outlet gas conduits 25a, 25b, are connected through cover 26, and are typically discharged to atmosphere. The inner end of gas conduit 27 is connected to a suction cup 60. Suction cup 60 has a passage therethrough, and has a lower suction surface for adhering against the outside of membrane 18 when the cover 26 is closed and clamped against the housing 22.

The housing 22 also has an outlet 30 which is connected to a suitable detector 34, via a conduit 32; FIG. 1A illustrates the detector as infrared (IR) sensor 34, which is particularly useful for detecting carbon dioxide gas. IR sensor 34 has an electrical output line 35 connected to an amplifier 36, and amplifier 36 is connected to a threshold detector 38. Threshold detector 38 is connected to suitable alarm circuits, as desired. IR sensor 34 also has an outlet gas conduit connected to a gauge 40, which is connected via a flow control valve 42 to a vacuum pump 44. Vacuum pump 44 exhausts to ambient air.

Housing 22 also has a gas inlet 23 which is connected via internal passages in housing 22 to a plurality of outlets along an upper edge of housing 22, which will be seen more fully hereinafter. Ambient air is conveyed via a solenoid valve 46 to the gas inlet 23, as will be explained more fully hereinafter.

Figure 2:
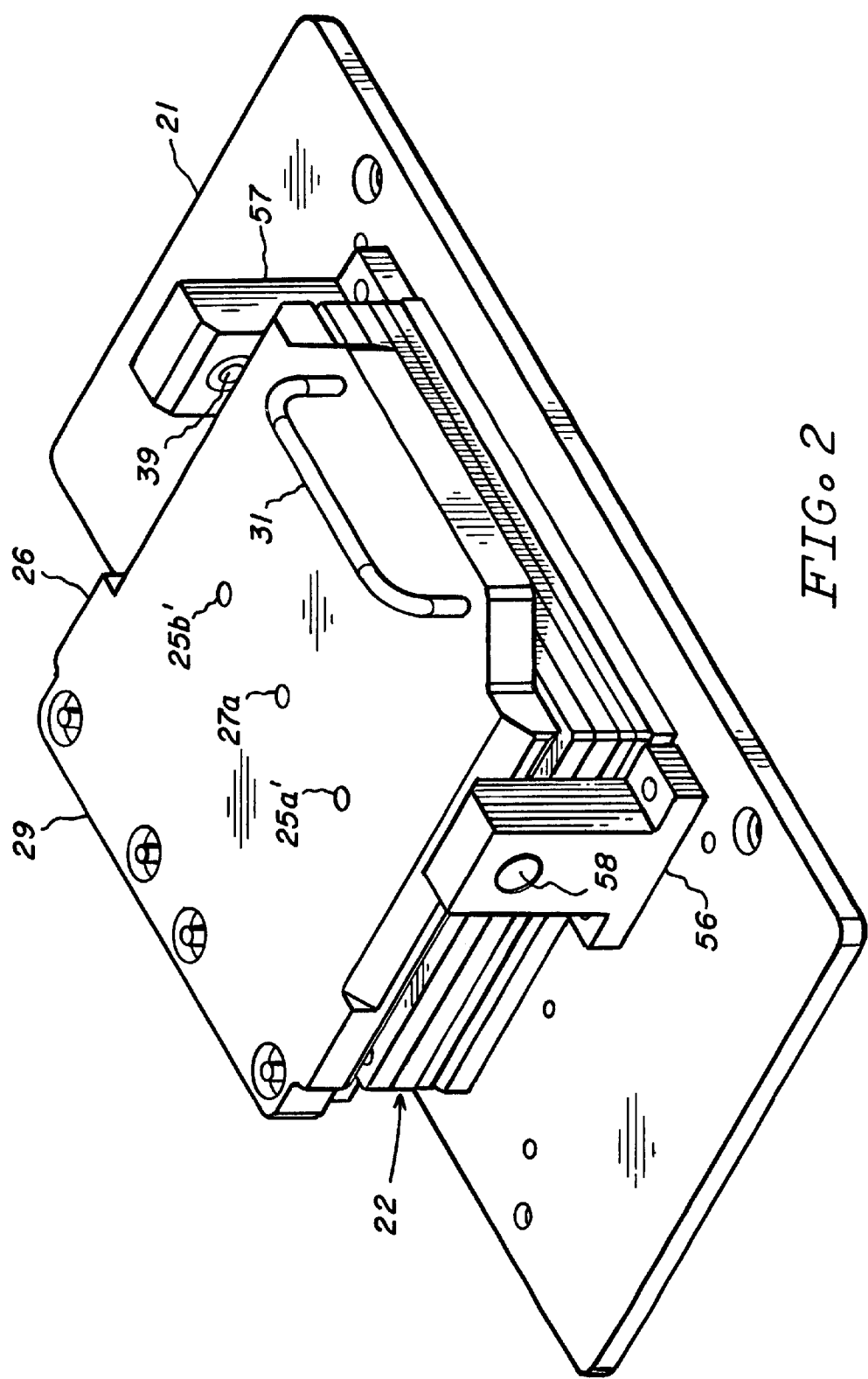
FIG. 2 shows an isometric view of the testing cell of the present invention.

FIG. 2 shows an isometric view of the testing cell of the present invention mounted to a base plate 21. A cover 26 is hingedly mounted along an edge 29 to housing 22. Cover 26 has a handle 31 for raising and lowering the cover. A pair of locking pedestals 56, 57, are affixed to base plate 21 adjacent to the cover position, and the locking pedestals have a ball detent mechanism 58, 59 which is spring loaded, and which captures the cover 26 in a closed position and which hold the cover 26 securely against the top of housing 22 during testing. A passage 27a passes through cover 26 and the inside suction cup 60, as described earlier, and is adapted for connection to gas conduit 27; a passage 25a' and a passage 25b' each pass through the cover 26, and are adapted for connection respectively to outlet gas conduits 25a, 25b.

Figure 3:
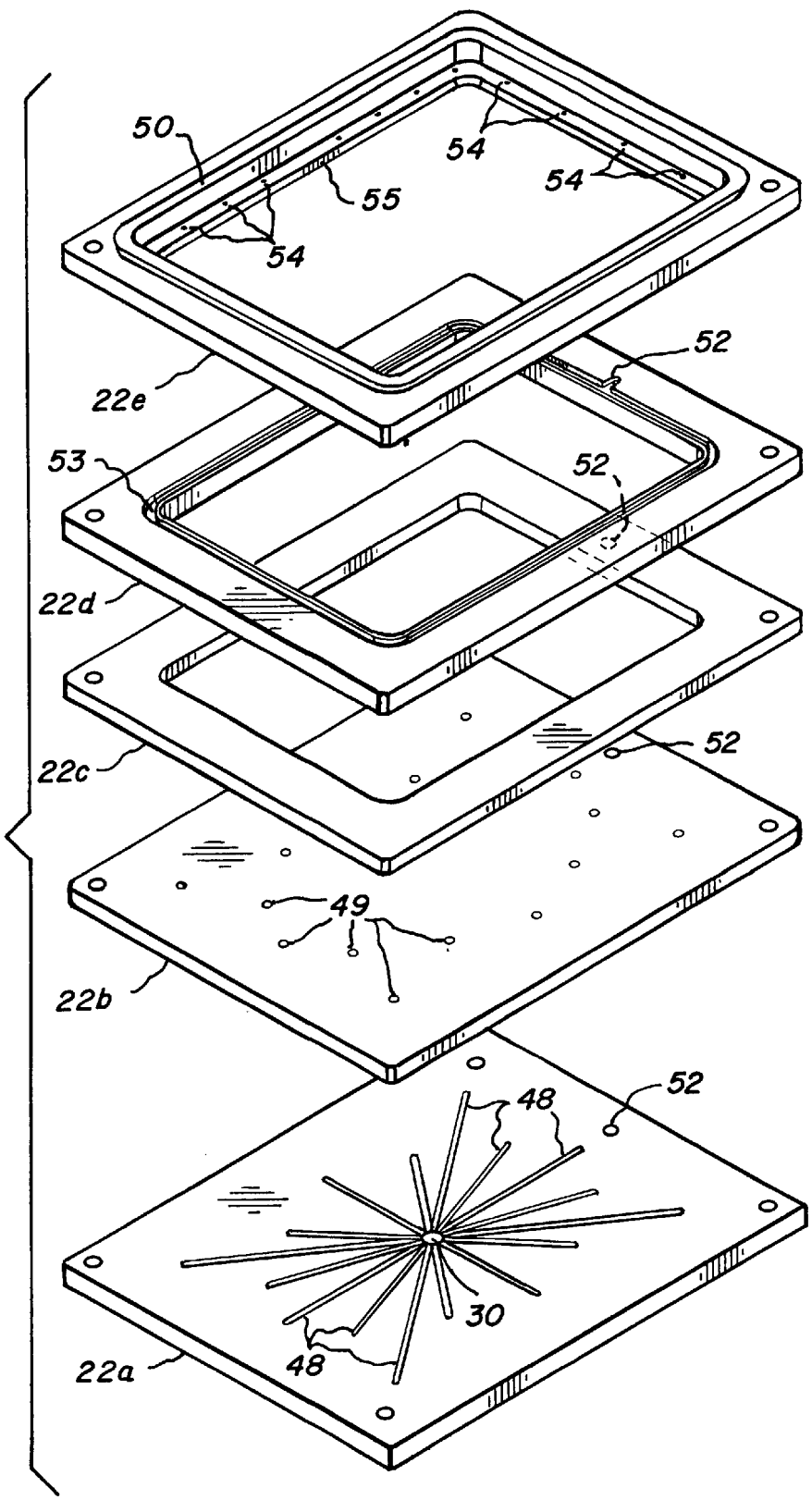
FIG. 3 shows an isometric exploded view of the components which form the chamber.

FIG. 3 shows an exploded view of housing 22, showing each of the layers that comprise housing 22. The layers are formed from stacked sections which are adhesively bonded together to form a sealed internal chamber 24 (see FIG. 1A). These sections include a lower grooved section 22a, a bottom passages section 22b, a spacer section 22c, an upper grooved section 22d, and an upper lip section 22e.

The lower grooved section 22a has a plurality of grooves 48 radiating outwardly from outlet passage 30, and a through passage 23. The bottom passages section 22b has the through passage 23, and a plurality of through passages 49, each passage 49 being aligned proximate an end of one of the grooves 48. Each passage 49 opens through the surface of passages section 22b, into the lower region of chamber 24. A spacer section 22c is aligned with the bottom passages section 22b, and also contains the through passage 23. The upper grooved section 22d has a peripheral groove 53 which runs about the perimeter of upper grooved section 22d and is in gas flow communication with a passage 52 located proximate one end of section 22d. Passage 52 connects to through passage 23, described earlier. The upper lip section 22e has an inwardly directed lip 55, and lip 55 has a plurality of pass-through passages 54 which are aligned above the peripheral groove 53 of upper grooved section 22d. Finally, upper lip section 22e has a raised flange 50 which is dimensioned slightly larger than the outer dimensions of the flange 14 of package 10 (see FIG. 1B), so that the package 10 can fit inside the raised flange 50.

Figure 4:
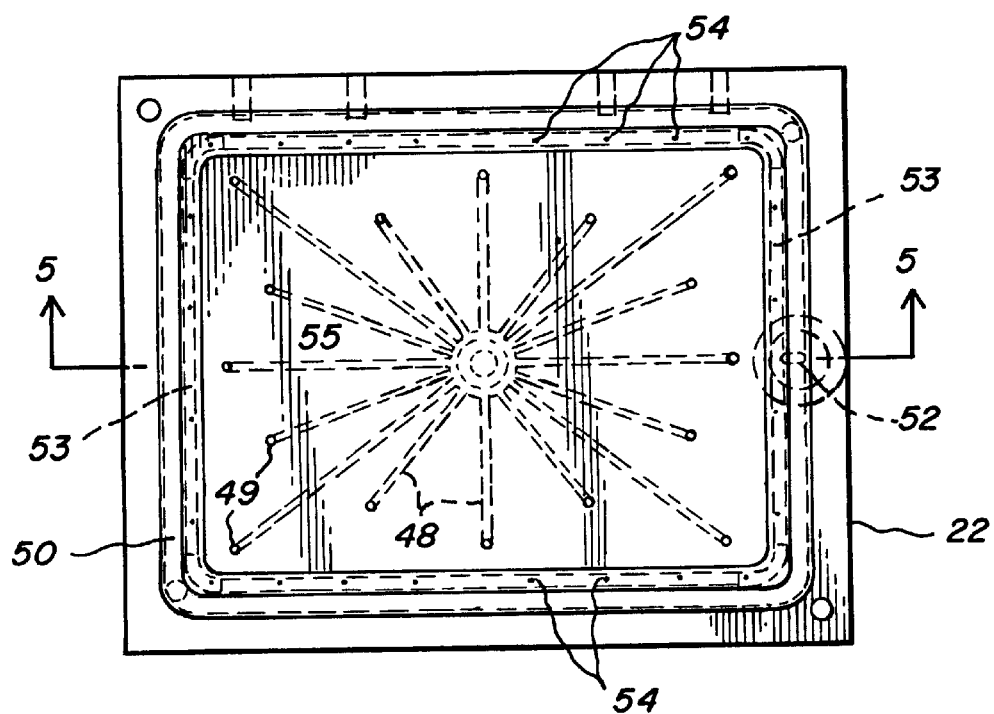
FIG. 4 shows a top view of the testing cell, with cover removed.
Figure 5:
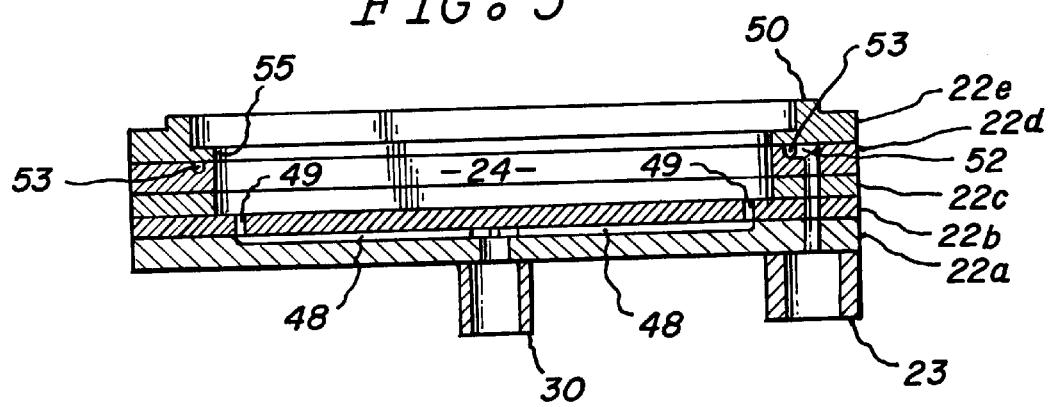
FIG. 5 shows a left side cross section view of the testing cell of FIG. 4.

FIG. 4 shows a top view of housing 22, with cover 26 removed, and FIG. 5 shows a cross section taken along the lines 4—4 of FIG. 4. In particular, FIG. 5 shows housing 22 is formed of stacked sections, including lower grooved section 22a, bottom passages section 22b, spacer section 22c, upper grooved section 22d, and upper lip section 22e. This construction provides an important feature of the present invention, which is to expose the entire lower volume of chamber 24 to access to outlet 30 approximately simultaneously. FIG. 5 also illustrates the gas passages associated with gas inlet 23. An internal passage 52 passes through the sections, and opens into the peripheral groove 53, which extends about the entire upper edge of grooved section 22d. A plurality of small holes are drilled through the lip 55, providing passages for gas or ambient air entering inlet 23 to be conveyed about the entire peripheral edge formed by lip 55, and upwardly into the upper volume of chamber 24.

Figure 7:
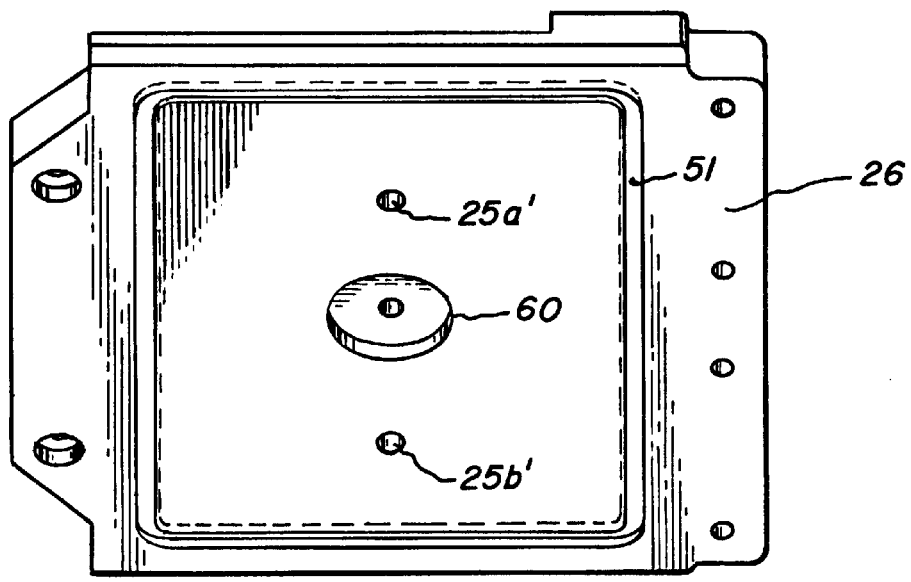
FIG. 7 shows an underside isometric view of the cover.
Figure 6:
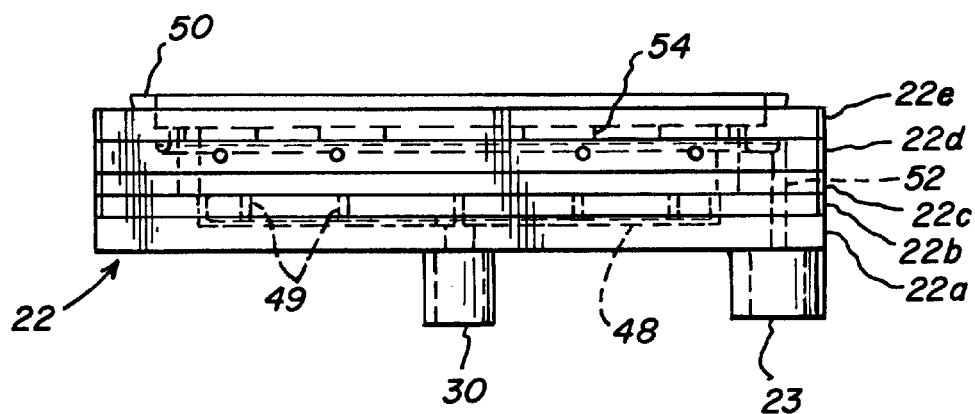
FIG. 6 shows a left side view of the testing cell with passages shown in dotted outline.

FIG. 6 shows a side view of housing 22, with the internal passages shown in dotted outline. FIG. 7 shows an isometric view of the underside of cover 26; an internal cavity in the underside of cover 26 is surrounded by an O-ring 51, with dimensions so as to permit O-ring 51 to contact against the top surface of raised flange 50, and thereby to provide a seal between the cover 26 and the housing 22. The gas conduit passage 27a opens through a suction cup 60, and suction cup 60 seals against the top surface of a package 10, as will be hereinafter described.

Prior to inserting a package 10 into chamber 24, an adhesive strip seal 61 is applied about the edge of the package 10 flange 14, such that the strip seal 61 extends beyond the outside edge of flange 14. See FIG. 8 for details of this attachment. The entire center section of membrane 18 is left uncovered. Whereas the flange 14 is sized to fit inside the raised flange 50 of upper lip section 22e, the strip seal engages against the raised flange 50. When the cover 26 is closed, the O-ring 51 tightly engages against the strip seal 61 to provide a complete seal of the upper surface of the package 10 about the raised flange 50.

In operation, the package is first prepared as described above, and then it is placed inside the housing, with the cover locked down to seal the package in the chamber. The vacuum pump is operated continuously during the test cycle, and the valve 42 and valve 46 are both opened, permitting a flow of ambient air through the chamber and the various conduits as a purging flow. The gas source is preferably carbon dioxide, and this gas is passed into the package through the passage 27 and suction cup 60, and through the membrane 18. Excessive gas is relieved to atmosphere via conduits 25a and 25b. After an equilibrium condition has developed, the valve 46 is closed, thereby stopping the flow of ambient air through the chamber 24. However, the vacuum pump continues to be operated, and any accumulated gas in the chamber will become pumped out of the chamber and toward the IR sensor. Next, the valve 46 is opened, permitting an in-rush of ambient air into the chamber 24 and flushing any residual gas from the chamber into the IR sensor, where it will be detected as a temporary transient signal. If a sufficient level of gas is detected, the threshold detector will trigger an alarm, notifying the operator that a gas leak exists in the package in excess or the permissible limits. The internal radiating pattern of grooves at the bottom of chamber 24 provide flow paths for gases in all parts of chamber 24 to quickly pass through the outlet 30 to the IR sensor 34, so that the volume of gas conveyed arrives as a slug of gas to the IR sensor 34, which then produces an output electrical pulse representative of the quantity of gas detected.

The present invention may be embodied in other forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. An apparatus for testing presealed packages for leaks, comprising:
   a) a housing having side walls and an open top, and a bottom wall, whereby an interior recess is formed in the housing, said housing having a first passage passing from outside the housing and through a proximately centered opening in the bottom wall; and a second passage passing from outside the housing and through a side wall of the housing to an opening into said recess proximate the top of said side wall;
   b) a plurality of grooves in said recess bottom wall, said grooves radiating outwardly from said proximately centered opening substantially completely across said bottom wall; and
   c) a cover sized for sealable attachment across the open top of said housing, said cover having a first gas passage proximately centered through said cover, and at least one second gas passage through said cover, and means for sealably clamping said cover against an upper edge of a presealed package placed in said recess, and sealably clamping said package against said housing; said first gas passage terminating inside said cover in a means for sealably attaching against a surface of said presealed package.

2. The apparatus of claim 1, further comprising a perimeter groove in said housing proximate the top edge of said housing and running along the interior of said recess, said perimeter groove communicating with said second passage through said housing.

3. The apparatus of claim 2, further comprising a source of gas connected to said cover first gas passage.

4. The apparatus of claim 3, wherein said source of gas further comprises nitrogen.

5. The apparatus of claim 4, further comprising a gas detector connected to said housing first passage, and a vacuum pump connected to said gas detector.

6. The apparatus of claim 5, further comprising an ambient air line connected to said housing second passage, and a shutoff valve in said air line.

7. An apparatus for testing a presealed package for leaks, the package comprising a plastic container having a top removable layer which is sealed about its perimeter to an upper edge of the plastic container, the layer being made from a material which is permeable to gases and impermeable to bacteria, comprising:
   a) a test housing having an interior recess, side walls, and a bottom wall, said bottom wall having a first passage proximately centered and an outlet projecting outside said bottom wall, and a plurality of grooves in the interior side of said bottom wall, said plurality of grooves constructed to radiate outwardly from said first passage; and a second passage in one of the side walls of said test housing, said second passage having a first outlet projecting outside said test housing and a second outlet opening proximate the top of said one side wall, and a peripheral groove about the perimeter of said side walls, said groove opening into said said second passage;
   c) a cover sized to overlay said test housing, and means for clamping said cover over said housing recess, to seal said cover against the upper edges of said side walls; the cover further comprising a first cover passage therethrough, and means for connecting said first cover passage to a source of gas; the cover further comprising at least one second cover passage therethrough, and means for connecting said at least one second cover passage to ambient air exhaust.

8. The apparatus of claim 7, further comprising a gas detector having an input connected to said housing first passage, and having an outlet; a vacuum pump connected to said outlet; and electrical means connected to said gas detector, for developing a signal representative of the quantity of gas detected by said detector.

9. The apparatus of claim 8, further comprising a threshold detector connected to said electrical means, and an alarm indicator connected to said threshhold detector; whereby electrical signals exceeding a predetermined threshhold level cause said alarm indicator to become activated.

10. The apparatus of claim 9, further comprising a conduit connected to said test housing second passage, said conduit connected to a valve, and said valve communicating with ambient air.

11. The apparatus of claim 7, wherein said cover further comprises a suction cup connected to said first cover passage, said suction cup being positioned on the underside of said cover, and having means for adhering to the top surface of said top removable layer of said plastic package.

* * * * *